(12) United States Patent
Zhao

(10) Patent No.: US 11,125,947 B1
(45) Date of Patent: Sep. 21, 2021

(54) MICRO-FABRICATED SELF-ALIGNED MOVING FIBER OPTICAL DEVICES

(71) Applicant: Photonwares, Inc., Woburn, MA (US)

(72) Inventor: Jing Zhao, Andover, MA (US)

(*) Notice: Subject to any disclaimer, the term of this patent is extended or adjusted under 35 U.S.C. 154(b) by 0 days.

(21) Appl. No.: 16/864,926

(22) Filed: May 1, 2020

(51) Int. Cl.
  *G02B 6/35* (2006.01)
  *G02B 6/36* (2006.01)
  *G02B 6/26* (2006.01)

(52) U.S. Cl.
  CPC ........... *G02B 6/3508* (2013.01); *G02B 6/262* (2013.01); *G02B 6/3564* (2013.01); *G02B 6/3594* (2013.01); *G02B 6/3652* (2013.01); *G02B 6/3656* (2013.01)

(58) Field of Classification Search
  None
  See application file for complete search history.

(56) References Cited

FOREIGN PATENT DOCUMENTS

FR     2725038 A1 * 3/1996

* cited by examiner

*Primary Examiner* — Michael Stahl
(74) *Attorney, Agent, or Firm* — Shifrin Patent Law; Dan Shifrin

(57) ABSTRACT

A passive self-alignment fiber-to-fiber optical device is provided. The device includes a silicon base, a fiber alignment region, and an actuation region. When the device is configured as a fiber optical attenuator, displacement of a plunger in the actuation region alters the alignment of two optical fibers in the fiber alignment region, thereby varying the optical intensity between the two fibers. A series of beams in the actuation region successively reduces an initial displacement of a first beam to a smaller displacement of the plunger. When the device is configured as an optical switch, displacement of the plunger in the actuation region displaces the first optical fiber from a first position in alignment with the second optical fiber into a second position in alignment with a third optical fiber.

26 Claims, 5 Drawing Sheets

MICRO-FABRICATED SELF-ALIGNED MOVING FIBER OPTICAL DEVICES

CROSS-REFERENCE TO RELATED APPLICATION

None.

FIELD OF THE INVENTION

The present invention is related to passive self-alignment fiber optical devices, including optical switches, optical attenuators, optical tap monitors, optical tunable filters, among others.

BACKGROUND OF INVENTION

Optical fibers are one of the most commonly used transmitting media in optoelectronic systems for telecommunication applications. Because the core diameter of optical fibers is very small, active alignment methods are usually employed for the coupling between optical fibers associated with optoelectronic devices. Many fiber optical devices, such as switches, attenuators, tunable filters, and tap monitors, require coupling between two or more fibers so that light signals can propagate between them or through light managing components located in the gap between them. Presently, this coupling is mainly achieved by a method that uses a collimator to expand the beam to a larger size with reduced angle sensitivity and a long propagation distance and then actively aligns between two or more fiber collimators to achieve low optical loss over the gap. Each collimator consists of a polished fiber end with an anti-reflection coating and an optical lens. The collimator fabrication process is laborious and includes polishing, coating, lens fabrication, and active optical alignment. The fiber optical device assembly using fiber optical collimators also requires active precision alignment that is done by skilled operators.

Efforts to reduce the complexity and cost of fiber-to-fiber optical coupling by passive means have been developed over the years. When two optical fibers are perfectly aligned end-to-end with tight spacing, light entering one fiber will continue into the second fiber after passing through the two adjacent ends. However, this type of fiber-to-fiber coupling requires high precision alignment, in which a micro-fabricated structure can play an important assistance role. The most common method is to use a V-groove to align fibers passively. In this method, circular fibers are placed into a precisely fabricated V-groove of the structure. The V-shaped geometry ensures that two fibers placed in the same V-groove from opposite sides are naturally aligned with each other when the two fiber ends meet. This type of fiber-to-fiber passive alignment eliminates coating, lens, active alignment normally associated with fiber coupling, significantly saving cost. However, because the fibers sit inside shallow V-grooves without being mechanically held in place, the alignment is sensitive to perturbations such as epoxy fillings. The V-groove passive alignment has, therefore, limited applications.

Another concept uses micro-fabricated trenches with springs on one side to passively align the fibers by pushing the fibers against an alignment wall with springs fabricated on the trench. An example of such a structure 10 is shown in FIG. 1A and consists of a flexible spring plate 12 and a straight wall 14 defining a trench 20 between them. As a fiber 16 is inserted into the trench 20, the spring plate 12 pushes the fiber 16 into contact with the wall 14, as illustrated in FIG. 1B. A cover piece 18 is put on top of the device that pushes the fiber 16 downwards to be in contact with the trench bottom. Therefore, the fiber 16 is passively aligned in the trench 20.

Because the trench 20 is sufficiently deep to hold the fiber 16 from all four sides, the design is more robust than a V-groove design, resulting in high reproducibility. However, previous application to switches is limited to using a reflection mirror moving in and out with electrostatic actuation. This approach has several drawbacks. Due to the need to insert a mirror, the gap between coupling fibers is large, which increases loss. Bare fiber coupling requires extremely precise mirror fabrication that increases the cost with reduced production yield.

SUMMARY OF THE INVENTION

Embodiments of the invention provide a passive optical alignment platform and method that is highly versatile in producing numerous types of fiber optical devices at low cost without sacrificing optical performance, such as insertion loss and extinction ratio. As disclosed herein, a structure having micro-fabricated trenches on a silicon base with a self-aligned spring is used to passively couple two or more optical fibers. Among them, one of the fibers is movable to couple with another fiber. The structure is an advantageous platform that enables a new way to make fiber optical devices without using lens and coating, resulting in broadband operation, low insertion, and significant cost reduction. The inventive passive alignment method broadens the application for numerous new passively aligned fiber-fiber optical devices.

Embodiments further provide types of fiber optical devices that are suitable to be fully assembled by a robot for low-cost volume production. The structure and method enable the next generation high bandwidth communication upgrade.

Embodiments further provide an economical optical device platform and method that are based on fiber-to-fiber coupling without using a lens or coating. Moreover, the devices may be produced on a micro-fabricated silicon base with a self-alignment apparatus that eliminates the need for costly active optical alignments. The structure and method passively produce optical devices without compromising optical performance, including return loss and optical power handling.

DETAILED DESCRIPTION OF THE SPECIFIC EMBODIMENTS

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details or with other methods, components, and so forth. In other instances, well-known structures, materials, or operations are not shown or described in detail to avoid obscuring aspects of the invention.

The important features and advantages are best described through embodiments. Disclosed herein are several embodiment examples, including switches, attenuators, tunable filters, and tap monitors with unprecedented cost reduction and performance improvement advantages.

The following detailed description is of the best currently contemplated modes of carrying out the present disclosure. The description is not to be taken in a limiting sense but is made to illustrate the general principles of the present disclosure, with the scope of the present disclosure being defined by the appended claims.

As used herein, the singular forms "a," "an," and "the" include the plural reference unless the context dictates otherwise.

Except where otherwise indicated, all numbers expressing quantities of ingredients, reaction conditions, and so forth used in the specification and the claims are to be understood as being modified in all instances by the term "about." Further, any quantity modified by the term "about" or the like should be understood as encompassing a range of ±10% of that quantity.

To describe and to define the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

FIGS. 2A-4 will be described as side views of the embodiments illustrated therein and the directions provided are to be understood as being relative to this view. Thus, up/above and down/beneath/below and similar terms are relative to the top and bottom, respectively, of the Figures. Left and right and similar terms are relative to the left and rights, respectively, of the Figures. And, front and back/rear and similar terms are relative to into and out of, respectively, the Figures. However, it will be appreciated that these relative directions are provided only for convenience in describing the embodiments and are not to be deemed limiting. The actual orientation of an embodiment may differ from that illustrated and described.

Figures 1A, 1B:
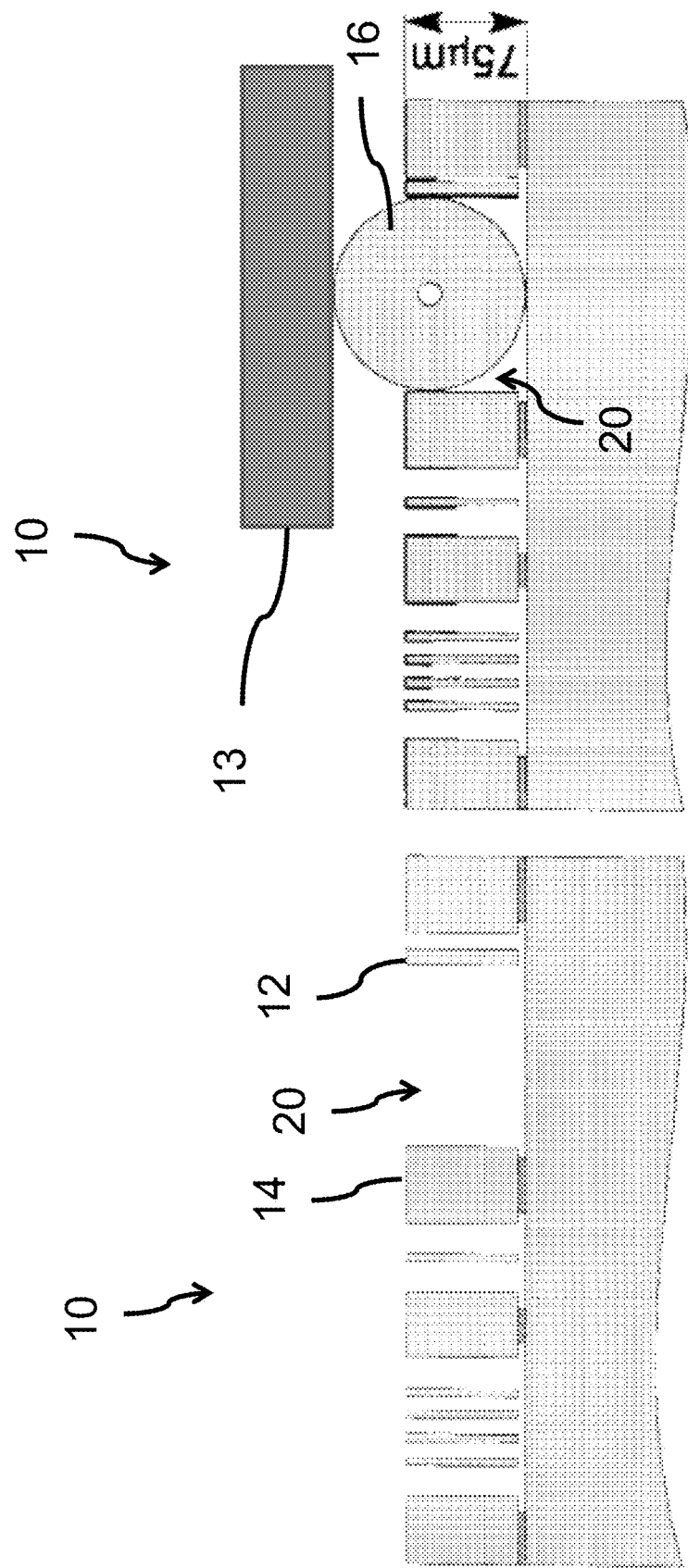
FIG. 1A is a schematic view of a prior art structure for micro-fabricated trench passive fiber alignment with side springs and top cover piece.
FIG. 1B is a schematic view of the prior art structure of FIG. 1A with a fiber optic being aligned.
Figure 2A:
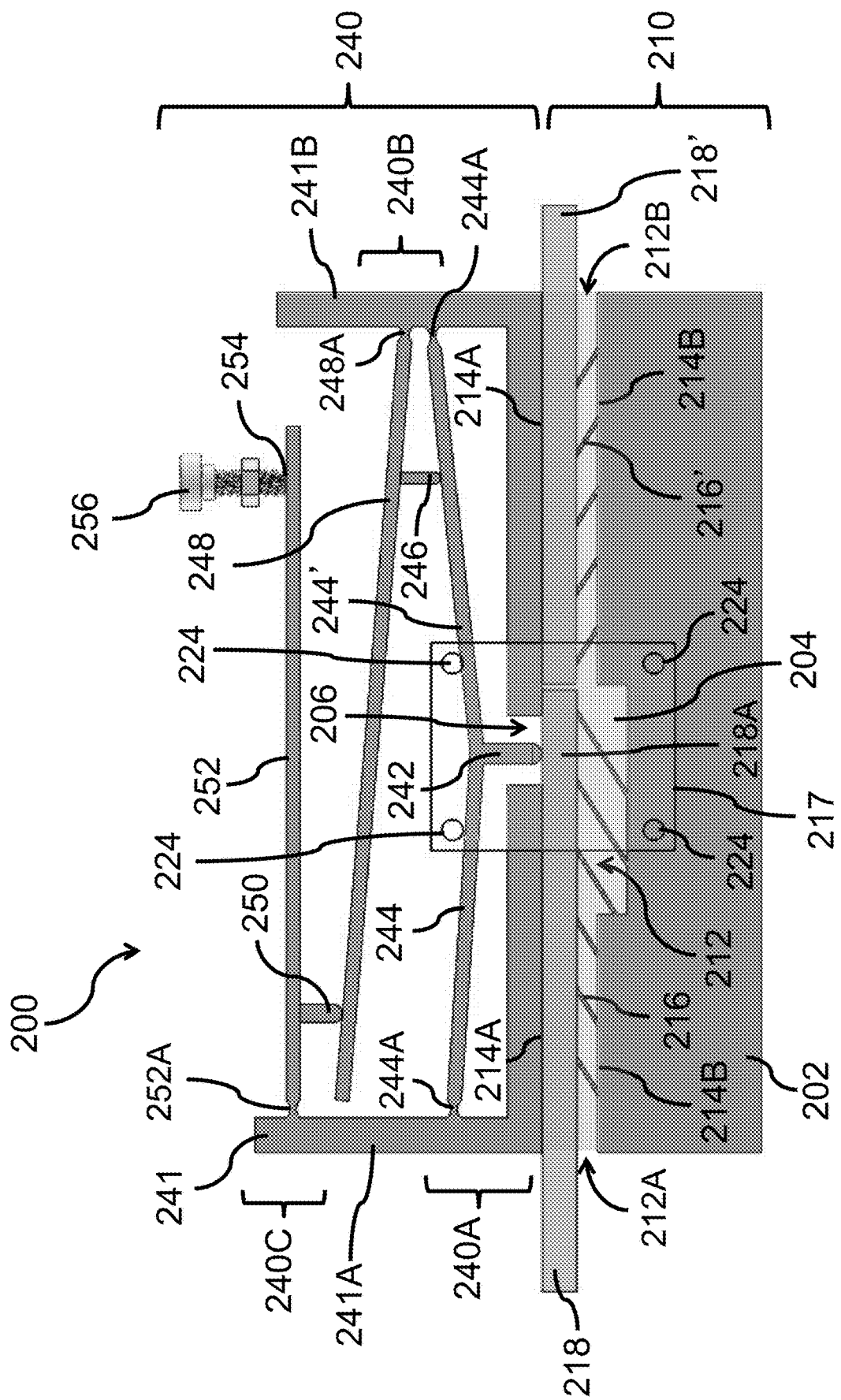
FIG. 2A is a schematic view of an embodiment of a manual variable optical attenuator according to the principles of the present invention.

A first embodiment of the present invention is a fiber optical attenuator 200, according to the invention, illustrated in FIG. 2A. The device 200 is formed on a silicon base 202 that comprises a fiber alignment region 210 and an adjacent actuation region 240 above the alignment region 210. Both regions 210, 240 have microstructures produced using silicon wafer, preferably a sandwich silicon on insulator (SOI) wafer using standard semiconductor wafer fabrication processes. In the fiber alignment region 210, the device contains a fiber trench guide (also referred to herein as a "trench") 212 that is etched into the silicon base 202 with open ends 212A, 212B in opposite sides of the base 202. The trench 212 has a straight flat back 204, opposite the open front and an upper alignment wall 214A on one side. Multiple leaf-springs 216 and 216' (only one spring of each set is identified in the Fig.) extend from the opposite lower wall 214B of the trench 212. The alignment wall 214A includes a gap 206. Each leaf-spring 216, 216' is a thin silicon beam having one end fixed to the wall 214B and the other end is free-standing and extending into the trench 212. The sets of springs 216, 216' may extend into the trench at any angle, including vertically. However, preferably the sets of springs 216, 216' angle upwards away from the open ends 212A, 212B, respectively, of the trench 212 for insertion of optical fibers (also referred to herein as "fibers") 218, 218' from the left and right sides of the base 202 towards the middle. As the pair of fibers 218 and 218' is inserted from the open ends 212A, 212B of the trench guide 212, the springs 216 and 216' push the fibers 218, 218' towards the alignment wall 214A, respectively, so that the fibers 218, 218' are in contact with the wall 214A and thus aligned with each other along the wall 214A. The inner ends of the fibers 218, 218' preferably are angled where they meet to avoid reflected light propagating back into the fibers' cores. The angle is preferably less than about 12 degrees.

The device 200 may further include a cover plate 217 (shown in transparent outline) that pushes the fibers 218, 218' into contact with the trench back 204. The cover piece 217 may be fixed to the base 202 with epoxy or other material, such as at the four corners or elsewhere, as represented by the four circles 224. The front to back depth of the trench 212 is preferably fabricated slightly less than the diameter of the fibers 218, 218' so that the cover piece 217 can contact the fibers 218, 218' and apply downward pressure to them against the back 204. Therefore, the fibers 218, 218' are aligned and securely retained in all three dimensions by this passive trench guide method.

The actuation region 240 contains a series of displacement reduction micro-fabricated spring actuators, which are made of single-crystal silicon beams. A first actuator 240A consists of a plunger piece 242, one end of which is in close contact with the inner end 218A of one of the fibers 218 through the gap 206 in the wall 214A. The other end is connected with the inner ends of two silicon beams 244 and 244', thereby joining the two beams 244, 244'. The outer ends of the beams 244, 244' are connected to opposite sides 241A, 241B, respectively, of an immovable frame 241 with flexible thin sections 244A, 244A'. (For convenience, the left and right sides of the frame 241 may be referred to herein as "the frame 241A" and "the frame 241B, respectively.") Preferably, both of the beams 244, 244' are angled up at a small angle from the plunger piece 242 towards the frame sides 241A, 241B in a shallow V-shape.

A second actuator 240B is fabricated within the frame 241 above the first actuator 240A and consists of a second plunger piece 246 that is located near the frame 241B. The lower end of the plunger piece 246 is in close contact with the beam 244' below; the upper end is connected to a third silicon beam 248, one end of which is connected to the frame 241B with a thin, flexible section 248A. The third beam 248 preferably angles upward away from its attachment to the frame 241B towards the opposite frame 241A.

A third actuator 240C is fabricated within the frame 241 above the second actuator 240B and consists of a third plunger piece 250 that is located near the frame 241A with the lower end in close contact with the beam 248 below and the other end connected with a fourth silicon beam 252. One end of the fourth silicon beam 252 is connected to the frame 241A with a flexible section 252A and extends towards the frame 241B with the other end free standing. The fourth beam 252 may be approximately horizontal.

The device may further include liquid with an optical index matching that of the fibers 218, 218' to fill the gap between them. This reduces the insertion loss by reducing its divergent angle and path length to bridge the light propagation. It also increases return loss, desirable for many applications.

Figure 2B:
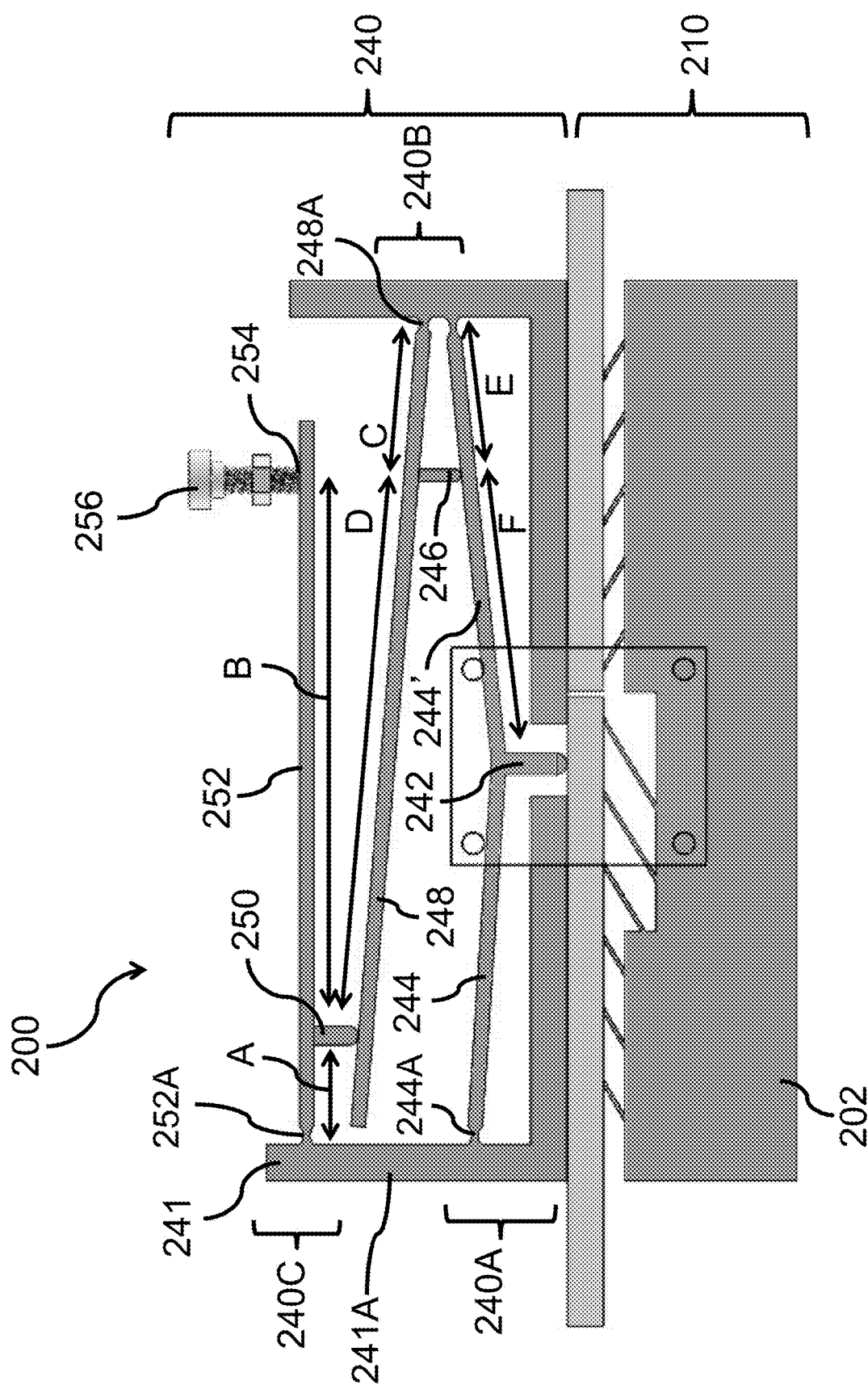
FIG. 2B is another schematic view of the embodiment of FIG. 2A in which distances are identified.

Referring also to FIG. 2B, in operation, the upper, fourth beam 252 is pushed downwards through a rod 254, such as by manually or electrically turning a screw 256 with fine threads. The beam 252 bends downwards at the flexible point 252A near the frame 241A in response, pushing the plunger 250 downward, which, in turn, bends the beam 248 downward. The displacement of the plunger 250 is smaller than that of the displacement of the screw 256 by a factor of A/B, where B is the distance from the plunger 250 to the screw 256, and A is the distance from the plunger 250 to the frame 241A. Through contact with the displaced beam 248, the plunger 246 moves downwards, which, in turn, bends the beam 244' downward. Again, the displacement of the plunger 246 is smaller than that of the displacement of the plunger 250 by a factor of C/D, where D is the distance from the plunger 250 contact point to the plunger 246 and C is the distance from the plunger 246 to the frame 241B. Because the plunger 246 is in contact with the beam 244', movement of the beam 244' also moves the first plunger 242 downwards, with a reduction factor of E/F, where F is the distance from the plunger 246 contact point to the plunger 242 and E is the distance from the center of the plunger 246 to the frame 241B. Consequently, the plunger 242 pushes the fiber 218 downward against the bias of the springs 216 to cause misalignment between the fibers 218 and 218'. The resulting total reduction in displacement of the inventive apparatus is A/B×C/D×E/F. A manual precision controllable fiber optical intensity attenuation function is therefore achieved.

Because the fiber core size is very small, only a few microns, manual controlled optical attenuation is difficult. The structure 200 illustrated in FIGS. 2A, 2B and described herein advantageously provides a micro-fabrication motion reduction apparatus that reduces the manual actuation displacement and consequently increases intensity control precision. The control precision may be further increased by increasing the number of actuators in series beyond the three described and illustrated herein. Moreover, all of the actuators and the moving fibers are naturally spring-loaded by the mechanical properties of the single-crystal silicon beams so that they respond to both up and down motions of the screw 256, a necessary feature for variable optical attenuators. The invention achieves all of the important features for fiber optical attenuator in a planar silicon platform that increases performance and reduces fabrication cost. Conventional manual fiber optical attenuators made of the discrete optical component have optical insertion loss about 0.5 dB, while the inventive device advantageously can achieve a significantly lower loss of about 0.1 dB with approximately a 5× or greater reduction in fabrication cost.

Figure 3:
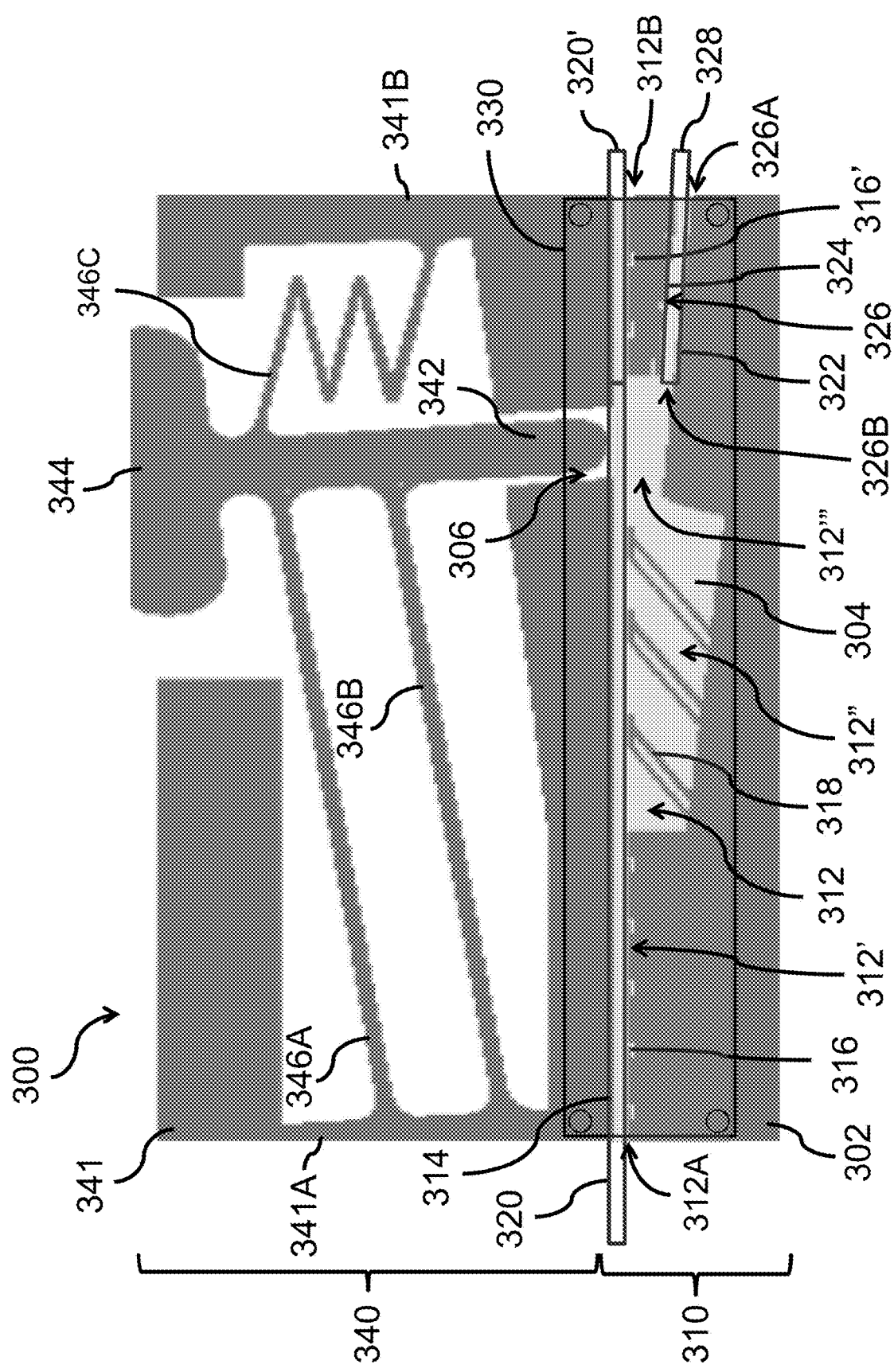
FIG. 3 is a schematic view of an embodiment of a mechanical fiber optical switch according to the principles of the present invention.

A second embodiment, according to the invention, is a fiber optical switch 300, illustrated in FIG. 3. The device 300 is fabricated on a silicon base 302 that comprises a fiber alignment region 310 and an adjacent actuating region 340, both having microstructures that have been produced using a silicon wafer, preferably using a sandwich SOI wafer using standard semiconductor wafer fabrication processes. In the fiber alignment region 310, the device 300 contains a first straight fiber trench guide 312 that is etched into the silicon base 302 with open ends 312A, 312B in opposite sides of the base 302. The trench 312 has a straight, flat, upper alignment wall 314 on one side, and multiple leaf-springs 316 and 316' as well as 318 extending from the side of the trench 312 opposite the alignment wall 314. A gap 306 is formed through the alignment wall 314. As illustrated in FIG. 3, the gap 306 is approximately three-fourths the distance from the left side to the right side of the base 302, although the gap 306 may be formed elsewhere along the alignment wall 314. Each leaf-spring 316, 316', 318 is a thin silicon beam extending from the side of the trench 312 opposite the alignment wall 314 and the other end free-standing and extending into the trench 312. The springs 316, 316' may extend into the trench at any angle, including vertically. However, preferably the springs 316, 316', 318 are angled upwards away from the open ends 312A, 312B, respectively, of the trench 312 from the left and right sides of the base 302 towards the gap 306. As a pair of fibers 320 and 320' is inserted from the left and right ends 312A, 312B of the trench guide 312, respectively, the springs 316, 316', 318 push the fibers 320 and 320' towards the alignment wall 314 so that they are in contact with the wall 314 and thus aligned with each other along the wall 314.

The switch device 300 further contains a second straight fiber trench guide 326 that is etched into the silicon base 302 with an outer open end 326A below one end 312B of the first trench 312, angled upwards toward the alignment wall 314, and having an inner open end 326B into the first trench 312. The second trench 326 includes a straight flat alignment wall 322 on one side, and multiple leaf-springs 324 on the side of the second trench 326 opposite the alignment wall 322. In the FIG., the alignment wall 322 is the lower wall of the second trench 326; however, the device 300 may be fabricated with the alignment wall 324 on the upper wall of the second trench 324 instead.

Each leaf-spring 324 in the second trench 326 is a thin silicon beam having one end fixed to the trench wall opposite the alignment wall 322 and the other end free-standing and extending upwards into the trench 326 at an angle that is away from the opening 326A of the trench 326. As a fiber 328 is inserted from the right end 326A of the trench guide 326, the springs 324 push the fiber 328 towards the alignment wall 322 so that it is in contact with the alignment wall 322.

In the FIG., the first trench guide 312 includes three regions. A first, outer region 312' may be slightly wider than the fiber 320. A second, middle region 312" is substantially wider than the first region 312'. And, the third region 312''' is wider than the first region 312' and narrower than the second region 312". The wall of the third region 312''' opposite the alignment wall 314 is angled downward from left to right such that it aligns with the wall 322 of the second trench 326, forming a continuous surface. Springs 316 and 318 extend only into the first and second regions 312' and 312", with the third region 312''' empty.

The trenches 312, 326 are etched into the base 302 with flat back 304 opposite the open fronts of the trenches 312, 326. The depth of the trenches 312, 326 is slightly less than the diameter of the fibers 320, 320', and 328. A cover plate 330 is placed over the fiber alignment region 310 and pushed towards the back 304 so that the fibers 320, 320', and 328 are positioned in the trenches 312, 326 in firm contact with the corresponding alignment walls and bottom surfaces.

In the actuation region 340, a spring-loaded plunger 342 is fabricated on a frame 341 and is connected to multiple springs 346A, 346B, 346C. The springs 346A, 346B, 346C are made of single-crystal silicon beams, two beams 346A, 346B are spaced-apart and parallel, having their inner ends connected to one side (the left side in the FIG.) of the actuator 342 and the third beam 346C having its inner end connected to the other side (the right side in the FIG.) of the plunger 342. The outer ends of the two beams 346A, 346B are connected to one side (the left side in the FIG.) 341A of the frame 341 and the outer end of the third beam 346C is connected to the opposite side (the left side in the Fig.) 341B of the frame 341. In the embodiment illustrated in the FIG., the outer end of each beam is lower than the inner end. As also illustrated in the embodiment of FIG. 3, the third beam includes a series of spring-forming bends.

In operation, the plunger 342 is pushed downwards via an actuator contact 344 through the gap 306 pushing the fiber 320 downward against the bias of the springs 318 through the third region 312''' of the second trench 312 to touch the second alignment wall 322. The fiber 320 moves from being in alignment with the fiber 320' to being in alignment with the fiber 328. The angle to which the fiber 320 is pushed downward corresponds with the angle of the second alignment wall 322. A fiber optical switching function is, therefore, achieved.

An electromagnetic relay switch may be used to push the micro-fabricated plunger 342 via the actuator contact point 344. Therefore, an electrically controllable fiber optical 1×2 switch is achieved without using complex active optical alignments. The disclosed invention allows fully automation of the fabrication process for low cost and high throughput production. It will be appreciated that the alignment region 310 may be fabricated to allow the fiber 320 to switch among more than only two fibers 320' and 328 by including a wider third region 312''' and additional guide trenches at increasingly steep angles. Provision may be provided for precise discrete displacements of the actuator 320 to specific positions corresponding to the additional guide trenches.

Figure 4:
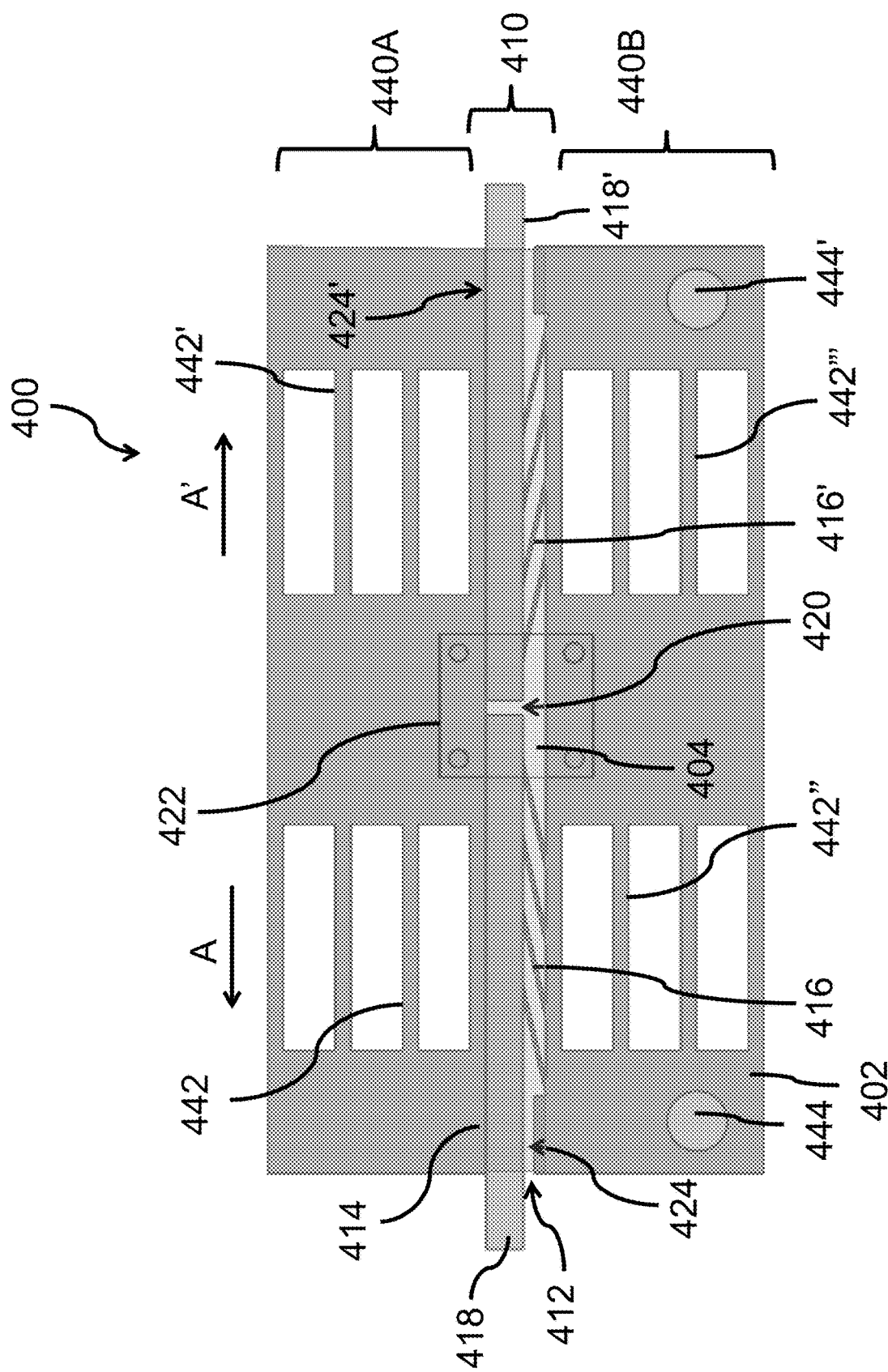
FIG. 4 is a schematic view of an embodiment of a mechanical fiber optical tunable filter according to the principles of the present invention.

A third embodiment, according to the invention, is a fiber optical tunable filter 400, illustrated in FIG. 4. The device 400 is fabricated on a silicon base 402 and comprises a fiber alignment region 410 and upper and lower actuating regions 440A, 440B (collectively 440) on opposite sides (above and below in the FIG.) of the fiber alignment region 410. The fiber alignment and actuating regions 410, 440 have microstructures produced using a silicon wafer, preferably a sandwich SOI wafer using standard semiconductor wafer fabrication processes employing lithography and etching. In the fiber alignment region 410, the device 400 contains a straight fiber trench guide 412 that is etched into the silicon base 402 with a flat back 404, a straight flat alignment wall 414 on one side, and multiple leaf-springs 416 and 416' on the side of the trench 412 opposite the alignment wall 414. The depth of the trench 412 is slightly less than the diameter of a fiber. Each leaf-spring 416, 416' comprises a thin silicon beam having one end fixed to the alignment wall 414; the other end is free-standing and extends into the trench 412 at an angle. The angle of the springs 416 and 416' is upwards and away from the respective ends of the trench 412.

As a pair of fibers 418 and 418' is inserted from the left and right ends of the trench guide 412, respectively, the springs 416 and 416' push the fibers 418, 418' towards the alignment wall 414 so that they are in contact with wall 414 and aligned with each other along the wall 414. The inner ends of the two fibers, 416 and 416' are coated with optical high reflection layers and are positioned with a gap 420 so that light is reflected back and forth between the two coated fiber ends to form an optical resonating etalon. A cover plate 422 is placed over the fiber alignment region and pushed towards the back 404 so that the fibers 416 and 416' are positioned in the trench 412 in contact with the back 404 surface of the trench 412 as well as with the alignment wall 414. The fibers 416 and 416' are fixed to the base 402 near the two outer ends 424 and 424' of the trench 412 using epoxy so that both fibers' ends at the center gap 420 are free to move. The cover piece 422 is also fixed to the base 402, such as at its four corners, by applying epoxy while the section of fiber-to-fiber gap area 420 is free of epoxy so that the two fiber ends near the center gap 420 are free to move.

Although other configurations may be used, the actuation regions 440A, 440B illustrated in FIG. 4 both include left and right sections, separated by a center section. The left and right sections both include several vertically spaced-apart, horizontal conducting silicon beams 442 and 442' (left and right, respectively, in the upper region 440A) and 442", 442''' (left and right, respectively, in the lower region 440B) to form a thermoelectric actuator.

In operation, a current is applied to a pair of electrodes 444 and 444'. As the current passes through the multiple conductive thin silicon beams 442, 442', 442" 442''', the beams 442, 442', 442", 442''' heat up and expand laterally outwardly from the center section of the device 400, as illustrated by the arrows A, A'. Consequently, the gap 420 between the fibers 416, 416' enlarges, resulting in a change in the etalon resonating peak position. When the current is reduced, the gap 420 is also reduced, and the optical resonance peak changes accordingly. Therefore, a fiber optical tunable filter is achieved without using complex active optical alignments. The disclosed invention allows automation of the fabrication process for low cost and high throughput production.

The above descriptions of the embodiments are very specific examples. It will be apparent to a person of average skill in the art that many variations are possible within the scope of the invention. Accordingly, the scope of the invention should be determined by the following claims and their legal equivalents.

Further, the descriptions of embodiments of the present invention have been presented for purposes of illustration and description, but are not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:
1. A fiber-to-fiber optical device, comprising:
a silicon base having first and second opposing sides;
a fiber alignment region fabricated into the base and into which first and second optical fibers are insertable towards each other from opposite sides corresponding to the first and second sides of the base, the fiber alignment region comprising:
a first fiber trench guide etched into the base and extending across a width of the base, the trench having an open front, a first flat alignment wall, and a first back surface, the first trench guide further having first and second sections, the first and second sections having first and second, respectively, open outer ends in a corresponding side of the base through which first and second optical fibers are insertable;

the first section comprising a first plurality of leaf springs extending from a wall of the first trench guide opposite the first alignment wall; and the second section comprising a second plurality of leaf springs extending from the wall of the first trench guide opposite the first alignment wall; and a cover plate configured to cover at least a portion of the first trench;

whereby, when the first and second optical fibers are inserted towards each other through the respective first and second open outer ends of the first and second sections and the cover plate is secured over the at least a portion of the first trench, the first and second plurality of leaf springs push the first and second optical fibers into contact with the first alignment wall, the cover plate pushes the first and second optical fibers into contact with the first back surface, and the first and second optical fibers are in alignment with each other;

an actuation region fabricated into the base adjacent the fiber alignment region, the actuation region comprising:

a frame having first and second sides corresponding to the first and second sides of the base;

a plurality of beams supporting the first plunger within the frame; and an actuator within the frame configured to vertically displace the first plunger by displacing the plurality of beams whereby the first optical fiber is vertically displaced; and a first plunger in the actuation region having a first end in contact with the first optical fiber through a gap in the actuation region;

whereby, displacement of the first plunger displaces the first optical fiber relative to the second optical fiber.

2. The optical device of claim 1, wherein the optical device is fabricated from a silicon wafer.

3. The optical device of claim 2, wherein the silicon wafer comprises a silicon on insulator wafer.

4. The optical device of claim 1, wherein the optical device comprises a fiber optical attenuator and movement of the first optical fiber relative to the second optical fiber alters optical intensity between the first and second optical fibers.

5. The optical device of claim 4, wherein:

the actuation region comprises a plurality of spaced-apart, vertically-stacked, displacement reduction micro-fabricated spring actuators in a series configuration within the frame;

each actuator comprises at least one of the plurality of beams;

a first spring actuator comprises the first plunger;

a second spring actuator comprising a second plunger contacting the first spring actuator;

whereby:

displacement of the second spring actuator by a first amount is transmitted through the second plunger by a second amount, smaller than the first amount, through the first spring actuator, and to the first plunger by a third amount, smaller than the second amount; and the first plunger moves the first optical fiber relative to the second optical fiber by the third amount.

6. The optical device of claim 4, wherein:

the plurality of beams in the actuation region comprise:

a first beam having a first outer end connected to the first side of the frame and having an inner end connected to the first plunger;

a second beam of length E+F having a second outer end connected to the second side of the frame and having an inner end connected to the first plunger;

a third beam having a third outer end connected to the second side of the frame;

a second plunger, located a distance C from the second outer end, extending from the third beam to contact the second beam at a distance F from the first plunger;

a fourth beam having a first end connected to the first side of the frame;

a third plunger, located a distance A from the first side of the frame, extending from the fourth beam to contact the third beam a distance D from the second plunger; and a rod in contact with the fourth beam a distance B from the third plunger;

whereby, a first displacement of the rod is transmitted through the fourth, third, second and first beams to displace the first plunger by a second displacement less than the first displacement.

7. The optical device of claim 6, wherein a total reduction in displacement from the first displacement to the second displacement equals $A/B \times C/D \times E/F$.

8. The optical device of claim 6, wherein each beam is connected to the respective side of the frame with a flexible section of beam thinner than the balance of the beam.

9. The optical device of claim 1, wherein the optical device comprises a fiber optical switch and movement of the first optical fiber relative to the second optical fiber comprises movement of the first optical fiber from a first position in alignment with the second optical fiber into a second position in alignment with a third optical fiber.

10. The optical device of claim 9, wherein:

the second section of the first fiber trench guide includes a third section, wider than the first section, adjacent to the gap in the actuation region and in which no leaf springs extend from the wall opposite the first alignment wall; and the fiber alignment region further comprises a second fiber trench guide etched into the base having:

an open front, a second flat alignment wall, and a second back surface;

a third plurality of leaf springs extending from a wall of the second trench guide opposite the second alignment wall;

a third open outer end in the second side of the base through which a third optical fiber is insertable, the third open outer end spaced apart from the second open outer end of the first fiber trench guide in the second section; and an inner opening connecting the second fiber trench guide with the third section of the first fiber trench guide;

whereby:

when the third optical fiber is inserted towards the second section of the first fiber trench guide through third open outer end and the cover plate is secured over the first trench, the third plurality of leaf springs push the third optical fiber into contact with the second alignment wall and the cover plate pushes the third optical fiber into contact with the second back surface; and when the first plunger is displaced, the first optical fiber is correspondingly displaced from the first position in alignment with the second optical fiber to a second position in alignment with the third optical fiber, whereby optical switching is performed.

11. The optical device of claim 10, wherein the plurality of beams in the actuation region comprise:
   a first beam having an outer end connected to the first side of the frame and having an inner end connected to a first side of the first plunger;
   a second beam having an outer end connected to the second side of the frame and having an inner end connected to a second side of the first plunger;
   whereby, when the actuator is vertically displaced, the first plunger is vertically displaced by a like amount against bias of the first and second beams.

12. The optical device of claim 11, wherein the plurality of beams further comprise a third beam spaced-apart from and parallel to the first beam, the third beam having an outer end connected to the first side of the frame and having an inner end connected to the first side of the first plunger.

13. The optical device of claim 11, wherein the outer end of the first beam is at a lower height than the inner end of the first beam and the outer end of the third beam is at a lower height than the inner end of the third beam.

14. The optical device of claim 12, wherein the outer end of the second beam is at a lower height than the inner end of the second beam and the second beam comprises a plurality of spring-forming bends.

15. The optical device of claim 1, wherein the actuator is manually driven.

16. The optical device of claim 1, wherein the actuator is electrically driven.

17. The optical device of claim 1, wherein:
   the first plurality of leaf springs extends from the wall of the first trench guide opposite the alignment wall at an upward angle away from the open outer end of the first section; and
   the second plurality of leaf springs extends from the wall of the first trench guide opposite the alignment wall at an upward angle away from the open outer end of the second section.

18. The optical device of claim 1, further comprising a liquid between the first and second optical fibers, the liquid having an optical index matching an optical index of the first and second optical fibers.

19. A passive self-alignment fiber-to-fiber optical device, comprising:
   a silicon base having left and right sides;
   a fiber alignment region, the fiber alignment region comprising:
      a first fiber trench guide etched into the base and extending across a width of the base, the trench having an open front, a flat alignment wall, and a back surface, the first trench guide further having first and second sections, each section having an open outer end in the corresponding side of the base through which first and second optical fibers are insertable;
      the first section comprising a first plurality of leaf springs extending from a wall of the first trench guide opposite the alignment wall;
      the second section comprising a second plurality of leaf springs extending from the wall of the first trench guide opposite the alignment wall; and
      a cover plate configured to cover at least a portion of the first trench;
      whereby, when the first and second optical fibers are inserted towards each other through the open outer ends of the first and second sections and the cover plate is secured over the at least a portion of the first trench, the first and second plurality of leaf springs push the first and second optical fibers into contact with the alignment wall and the cover plate pushes the first and second optical fibers into contact with the back surface and into optical alignment with each other;
   an actuation region fabricated in the base adjacent the fiber alignment region, comprising
      a frame having first and second sides; and
      an actuator within the frame configured to move the first optical fiber relative to the second optical fiber.

20. The optical device of claim 19, further comprising a liquid between the first and second optical fibers, the liquid having an optical index matching an optical index of the first and second optical fibers.

21. The optical device of claim 19, wherein the optical device comprises a fiber optical attenuator and movement of the first optical fiber relative to the second optical fiber alters optical intensity between the first and second optical fibers.

22. The optical device of claim 21, wherein:
   the actuator comprises:
      a plurality of beams; and
      a plunger coupled between a first beam and the first optical fiber; and
   displacement of a second beam by a first amount is sequentially transmitted through each other beam to the first beam by successively smaller amounts.

23. The optical device of claim 19, wherein the optical device comprises a fiber optical switch and movement of the first optical fiber relative to the second optical fiber comprises movement of the first optical fiber from a first position in alignment with the second optical fiber into a second position in alignment with a third optical fiber.

24. The optical device of claim 23, wherein:
   the actuator comprises:
      a plurality of beams: and
      a plunger supported by the plurality of beams and coupled to the first optical fiber; and
   displacement of the plunger displaces the first optical fiber from the first position to the second position.

25. The optical device of claim 19, wherein the actuator is manually driven.

26. The optical device of claim 19, wherein the actuator is electrically driven.

* * * * *